Feb. 16, 1960            R. DIENER            2,925,000
DEVICES FOR THE AUTOMATIC ADJUSTMENT MORE
PARTICULARLY OF CARRIAGES OR THE
LIKE ON MACHINE TOOLS

Filed June 12, 1957            4 Sheets-Sheet 1

Inventor:
RICHARD DIENER
By Hane and Nydick
ATTORNEYS

Feb. 16, 1960
R. DIENER
2,925,000
DEVICES FOR THE AUTOMATIC ADJUSTMENT MORE
PARTICULARLY OF CARRIAGES OR THE
LIKE ON MACHINE TOOLS
Filed June 12, 1957
4 Sheets-Sheet 2

Inventor:
RICHARD DIENER
By Hane and Nydith
ATTORNEYS

Feb. 16, 1960 R. DIENER 2,925,000
DEVICES FOR THE AUTOMATIC ADJUSTMENT MORE
PARTICULARLY OF CARRIAGES OR THE
LIKE ON MACHINE TOOLS
Filed June 12, 1957 4 Sheets-Sheet 4

Inventor:
RICHARD DIENER
By Hause and Nydick
ATTORNEYS

United States Patent Office 2,925,000
Patented Feb. 16, 1960

2,925,000

DEVICES FOR THE AUTOMATIC ADJUSTMENT MORE PARTICULARLY OF CARRIAGES OR THE LIKE ON MACHINE TOOLS

Richard Diener, Berlin-Hermsdorf, Germany, assignor to Berliner Maschinenbau A.G., vorm. L. Schwartzkopff, Scheringstrasse, Berlin, Germany, a German body corporate Application June 12, 1957, Serial No. 665,296

Claims priority, application Germany July 5, 1956

3 Claims. (Cl. 77—4)

This invention relates to a device by means of which a movable part, such as a tool holder, work table or the like, is moved by pre-selection of a measuring gauge into an exactly predetermined position automatically and rapidly in relation to a fixed datum position of the device, and it constitutes a further improvement in or modification of the arrangement described in Application Ser. No. 442,035 filed July 7, 1954, by Richard Diener.

The present application is a continuation-in-part of the aforesaid patent application Serial No. 442,035.

The prior application aforesaid relates to a device in which the position of a carriage, for example of a work table, is exactly determined by means of sets of measuring gauges. The arrangement is such that, after effected pre-selection of a certain gauge, the gauge combination corresponding to the selected gauge is assembled automatically and introduced between stops, whereupon the carriage is likewise caused to bear automatically with its stop against the selected gauge.

A disadvantage associated with this arrangement consists in the fact that the datum zero point forming the basic factor in respect of the gauges is in a fixed position and cannot be adjusted as required according, for example, to a reference bore, whereby considerable difficulties are encountered upon the alignment of a tool according to a work piece prior to processing.

It is the object of the improvement according to the invention to overcome the disadvantage aforesaid, which is effected by the fact that the stop movable with the carriage is not rigidly connected to the carriage, but may be placed in fixed but detachable connection with the carriage or the bed as required by means of a suitable, for example electrical, clamping device. In this way, owing to the fact that the position of the carriage may be varied in relation to the stop, the possibility is provided by the invention of adjusting the datum point in respect of the gauge settings according to a desired reference bore in the piece of work being processed.

In order that the invention may be more readily understood an embodiment thereof will now be described by way of example with reference to the accompanying, partly diagrammatical drawings, in which Fig. 1 is a longitudinal section through a measuring gauge setting means according to the prior application aforesaid, showing diagrammatically an hydraulic carriage displacement and auxiliary means in accordance with the invention.

Figure 1:
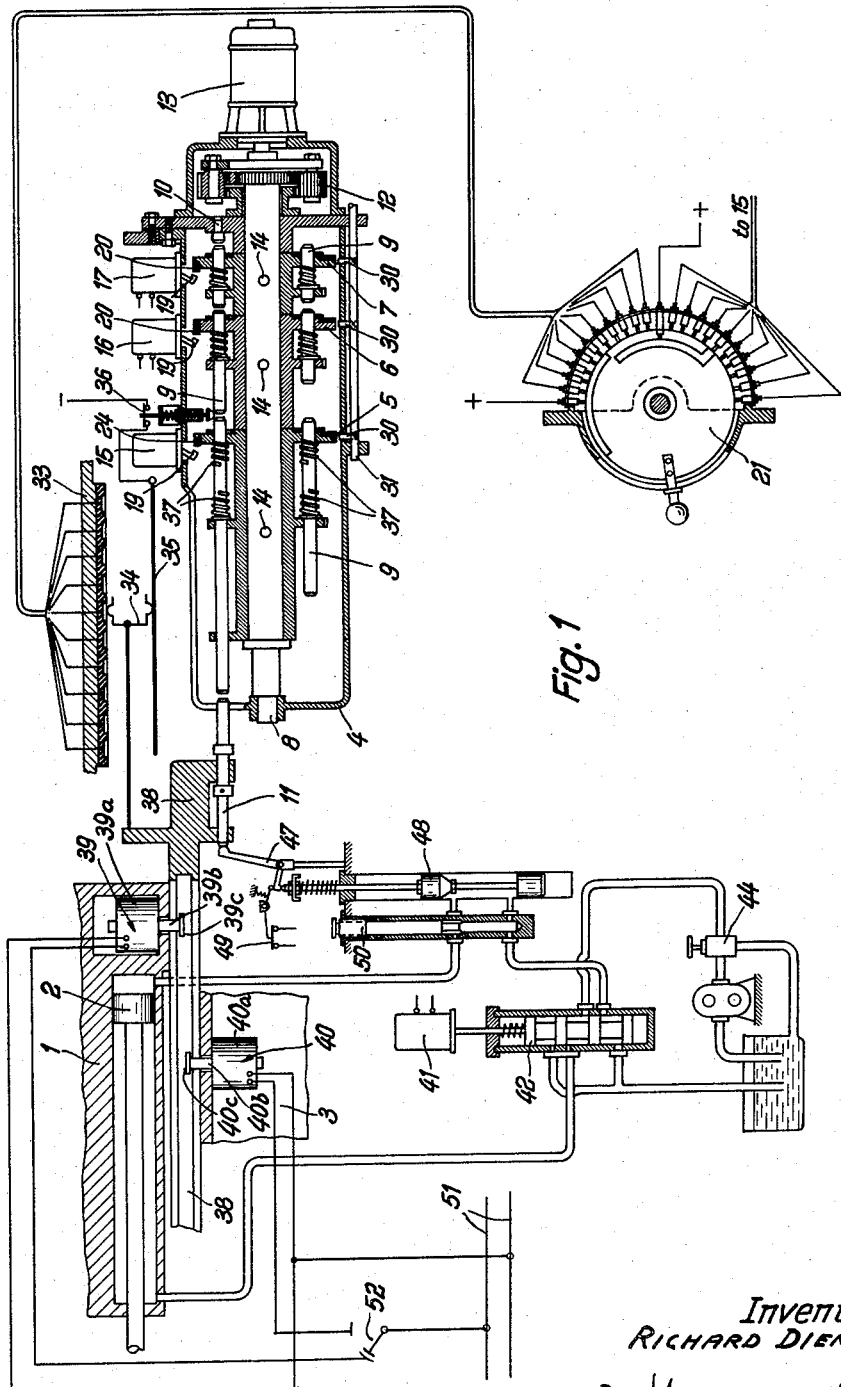

In the said application Ser. No. 442,035 there is illustrated by way of example an arrangement in which a carriage 1 (shown only in part), which may serve for the accommodation of tools, work pieces, measuring instruments or the like, may be moved by means of pressure fluid, which acts on a piston 2, on a bed 3 (not shown). The carriage may also be shifted by any other desired means of a known character. In Fig. 1 there is illustrated diagrammatically an hydraulic system of the kind known per se.

In the bed is fitted a gauge drum 4, in which gauges 9 are provided in tens in gauge carriers (of which in the present example there are only three) 5, 6 and 7 and are arranged together with the gauge carriers to be rotatable on a shaft 8. The gauge carriers 5–7 are capable in each case of setting one of the gauges in the stop line. The stop line is the connecting line between a fixed stop 10 on the bed and a movable stop 11.

Figure 2:
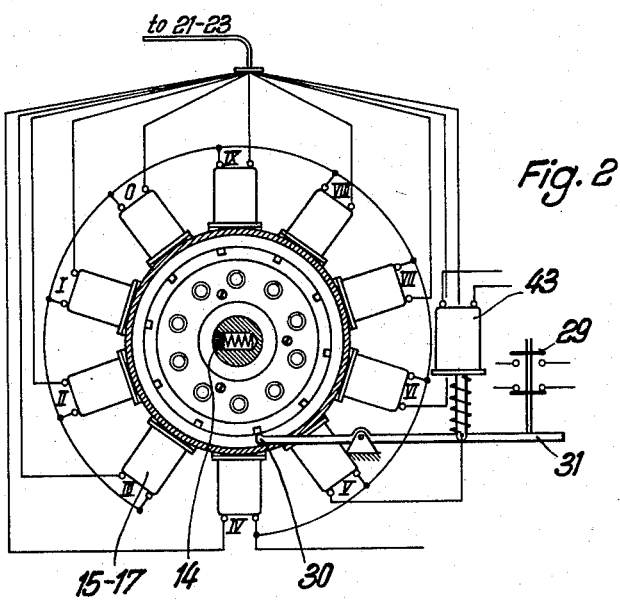
Figs. 2 and 3 show a cross-section through a gauge drum having setting magnets and switches according to the said prior application.

Rotation of the gauge carriers 5—7 takes place by means of an electric motor 13 by way of a planet wheel gear 12 and the shaft 8. Between the shaft 8 and the gauge carriers 5—7 there is provided a frictional connection, the friction of which is increased, for example, by spring-loaded friction elements 14, which are let into the shaft 8. Setting of the selected gauge 9 in the stop line between the stops 10 and 11 takes place by means of electro-magnets 15—17 (Figs. 1 and 2).

Figure 4:
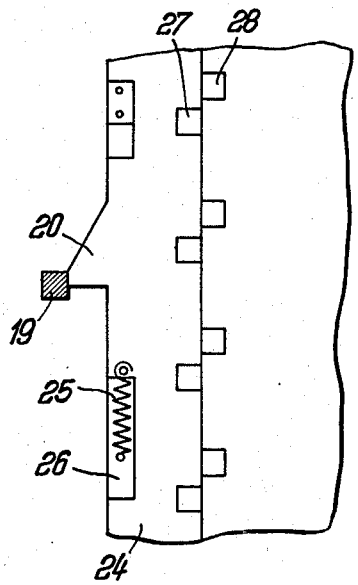
Figs. 4 and 5 show to enlarged scale an evolute plan view of a part of a gauge carrier according to the said earlier application in various positions of operation.
Figure 5:
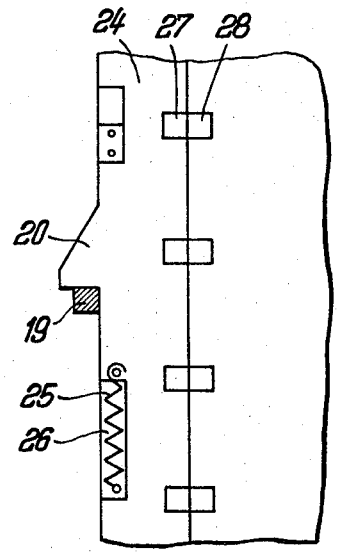
Figure 6:
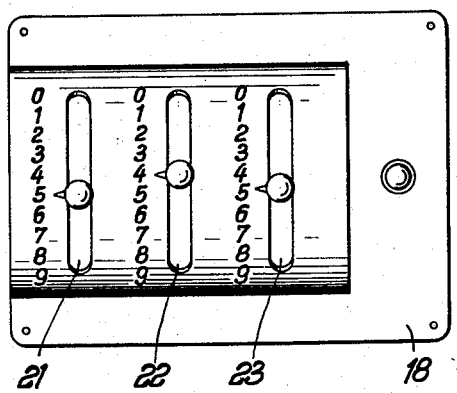
Figs. 6 and 7 show an end view and a sectional view of a pre-selector according to the earlier application.
Figure 7:
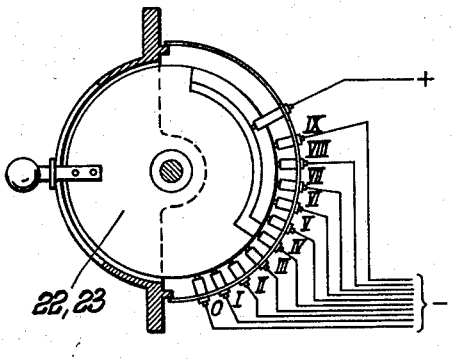

About each gauge carrier 5—7 there are provided in circular fashion as many electro-magnets 15—17 as there are gauges. For the metric system a gauge carrier has ten gauges 9, to which there also correspond ten electro-magnets 15—17. For the purpose of setting a gauge 9 in the stop line one of the electro-magnets 15—17 corresponding to such gauge is energised by a pre-selector 18, whereby a pawl 19 on the electro-magnet is moved towards the particular gauge carirer 5—7. Suitable preselecting arrangements are well known in the art and described in detail for instance in co-pending application Serial No. 442,035. The preselector is diagrammatically shown in Figs. 6 and 7 of this application. If now the gauge carriers 5—7 are set into rotation by the electric motor 13 by way of the planet wheel gear 12 and the shaft 8, the gauge carrier in question is caused to engage with a projection 20 against the projecting pawl 19. In this way the rotation of the gauge carrier, which has been moved only by friction, is stopped, and the pre-selected gauge 9 is set in the stop line. The pawls 19 are held by spring force in the position of release according to Fig. 1, and are moved by the electro-magnets 15—17 in opposition to the spring force into the locking position against the gauge carirer 5—7. Since each gauge carrier 5—7 is furnished with a series of electro-magnets 15—17, each having a corresponding switch in the pre-selection device 18 (for example electro-magnet 15, switch 21; electro-magnet 16, switch 22, and so forth), the gauges 9 determined by pre-selection are set simultaneously in the stop line in all gauge carriers 5—7 upon rotation of the latter. On each carrier 5—7 there is mounted a ring 24, which also carries the projection 20, in such a way that the same is capable of performing a small angular movement. By means of a tension spring 25, which is located in a recess 26, the ring 24 is held in such a way that grooves 27 in the ring and grooves 28 in the gauge (Fig. 4) do not register. If, however, by means of one of the electro-magnets 15—17, through the medium of one of the pawls 19, the gauge carrier 5—7 is arrested in its rotary movement, which is brought about by the pawl 19 moving into engagement with the projection 20, the ring 24 is so rotated in opposition to the spring force that the grooves 27 and 28 are made to register one with another (Fig. 5). In order to ensure that the rotation of the gauge carriers 5—7 by the electric motor 13 is not stopped, and the next operation is not initiated, until all gauges 9 have been correctly located in the stop line in accordance with the pre-selection, there is provided a switch 29 having a comb-like switch lever 30, 31. The lever 30, 31 possesses as many teeth 30 as there are gauge carriers 5—7. The hook-like ends of the teeth 30 are so constructed that they are capable of engaging in the registering grooves 27, 28 of the gauge carriers 5—7, which is only possible, however, if the grooves 27, 28 of all gauge carriers are in registry, or in other words, if all pre-selected gauges 9 are correctly located in the stop line. In this way actuation of the switch 29 by the lever 30, 31, and initiation of the next operation, is possible only when all gauges 9 have been correctly set.

In order that the carriage, or the stop 11, prior to the setting of a gauge 9, does not require to be withdrawn to a greater extent than would be necessary in respect of the pre-selected gauge, there is provided on the bed a contact bar 33 (Fig. 1). This bar carries contact elements which are insulated one from another and the distances between which correspond to the differences in the length of the measuring gauges 9 on the gauge carrier 5 having the longest gauges. Upon movement of the stop 11 there moves over the contact bar 33 a wiping contact 34, which is connected to the stop in insulated fashion and effects connection between the respective contact elements of the bar 33 and a bar 35. The contact elements on the bar 33 are electrically connected to corresponding contacts of the switch 21, whilst the bar 35 is connected to the terminal of a switch 36. The latter is a safety switch, which permits of the flow of current only when the gauge is in its position of rest, i.e., when the stop 11 has been withdrawn and the gauges have been moved into the position of rest by springs 37. As shown in Fig. 1, switch 36 includes a spring loaded rod terminating in a conical portion which enters in one of the gaps formed between the gauges when the latter are freed in the stop line by withdrawal of carriage 1 and stop 11 thereby causing closing of the switch by spring action. The conical portion rests upon one of the gauges when the same are pressed together thereby causing lifting of the rod and thus opening switch 36.

According to application Ser. No. 442,035 aforesaid the stop 11 is rigidly connected to the carriage 1, but in the present case the stop 11 is carried by a support 38 which is freely shiftable in the same direction as the carriage 1. In the embodiment illustrated the carriage 1 and the bed 3 are each furnished with an electro-magnetic clamping device 39 and 40, by which the support 38 and the stop 11 may be firmly connected as desired to the carriage 1 and bed 3 respectively. Control of the two clamping devices 39, 40 takes place by means of a change-over switch 52 provided in association with the pre-selector 18. Switch 52 serves to connect either one of the devices 39 and 40 to a source of current 51. The clamping device 39 comprises an exciting coil 39a and a core 39b terminating in a clamping head 39c. Similarly device 40 comprises an exciting coil 40a, a core 40b and a clamping head 40c. The pre-selection device 18 (Figs. 6, 7) possesses as many selector switches 21 to 23 as there are gauge carriers. The selector switch 21 provided in respect of the gauge carrier 5 having the longest measuring gauges 9 also possesses the series of contacts intended for the setting of the contacts of the bar 33 (Fig. 1). In this way, upon the setting of one of the gauges 9 of the carrier 5, there is also determined at the same time the return movement of the stop 11, as will be described.

The operation of the device according to application Ser. No. 442,035 aforesaid, equipped with the improvement according to the invention, is as follows:

For the setting of the datum point of the device in accordance with the reference bore of a piece of work mounted on the carriage the pre-selection switches 21—23 are first set to zero. By the throwing over of a combination switch to datum point adjustment the support 38, or stop 11, is connected to the carriage 1 by means of the clamping device 39, and there is initiated the automatic setting of the device to the datum point. A magnet 41 adjusts the control member 42 for return movement of the carriage 1. The stop 11, which is now connected to the carriage 1, is withdrawn from the measuring gauges 9. The wiping contact 34, which upon the return movement of the stop 11 wipes over the contacts of the bar 33, serves to stop the return movement of the carriage 1 upon completion of a circuit through bar 35 immediately it moves against an energised contact in the switch 21. Since zero is now adjusted on the switch 21, all contacts of the bar 33 are connected, and the stop 11 will be withdrawn only to such an extent that the gauges 9 are released and are moved by the springs 37 into the position of rest. This causes closing of switch 36 as described and the switch 36 completes the circuit through bar 35. The control circuits are more fully shown in co-pending application Serial No. 442,035. In this way a magnet 43 (Fig. 2) receives current for a brief space of time, whereby the teeth 30 of the lever 30, 31 release the gauge carriers 5—7, and after rotation thereof again bear resiliently against the edges of the gauge carriers.

Figure 3:
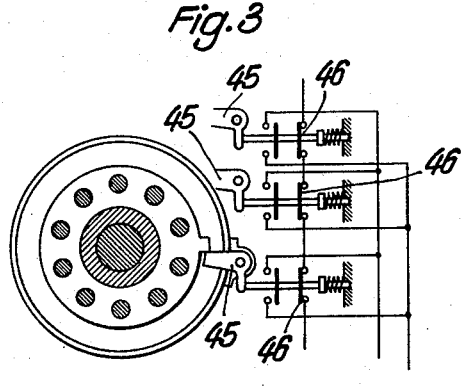

Owing to the disengagement of the teeth of the lever 30, 31 the uper contact of the switch 29 is opened. The magnet 41, which has also received current, adjusts the control piston 42 to idle movement, i.e., the pressure fluid flows by way of the relief pressure valve 44 back to the container, and the carriage remains stationary. If the upper contact of the switch 29 is opened, the lower contact is closed and, by way of an actuating segment, switches on the electric motor 13, which moves the gauge carriers into the initial position. In the latter they are held by pawls 45, as shown by Fig. 3. The pawls 45 have pressed the duplex switches 46 outwards. A pawl and a duplex switch are provided in respect of each gauge carrier. The inner contacts of the duplex switches 46 are connected in parallel, and the outer contacts in series. The parallel-connected contacts are opened by the pawls 45 and disconnect the electric motor 13, but in consequence of the parallel connection this does not occur until the final contact has been opened. The outer contacts of the switches 36 connected in series are closed. Since the combination switch is set to datum point adjustment the direction of rotation of the electric motor 13 is reversed by means of a polarity reversing device (for example a magnetic switch) without the same being set into motion, and the movement of the carriage 1, or the stop 11, against the gauges 9 is initiated by means of the magnet 41. The carriage 1 advances until the stop 11 has moved the zero gauge 9 located in the stop line against the stop 10. The switch 36 is thereby opened and breaks the circuit. Upon movement of the stop 11 against the gauge 9 the latter, by way of a lever 47, actuates a valve 48, which reduces the flow of pressure fluid to the piston 2 in proportion to the distance covered by the stop, in order that the collar on the stop 11 and the co-operating bearing on the support 38 on the one hand and the gauge 9 in the stop line on the other hand will not be able to strike abruptly one against the other. Before the collar on the stop 11 has reached its co-operating bearing on the support the control operation by means of the valve 48 has been completed, and by way of the lever 47 there is actuated a switch 49 connecting a relay which, following the lapse of a certain period of time, de-energises the control circuit. In this period there is built up by way of an exactly adjustable throttle 50 against the piston 2 an even fluid pressure, by means of which the measuring gauges are pressed together in the stop line. In this zero position the support 38 is firmly connected by means of the clamping device 40 to the bed 3. Device 40 is energized by moving switch 52 into the appropriate position. The carriage 1 is thereupon released from the support 38 by release of the clamping device 39, is adjusted by means of manual control of the feed according to the reference bore in the piece of work, and is again firmly connected to the support 38 by the clamping device 39. Following thereon the clamping device 40 connecting the support 38 to the bed is again released. In this way the datum or zero point of the device has been adjusted in accordance with the reference bore in the work piece, and there may then be selected on the pre-selector 18 a desired measuring gauge, which is determined by the drawing and is then set automatically on the basis of the reference bore. The automatic course of this setting operation is initiated by the throwing over of the combination switch to gauge adjustment, which sets into operation the actuating elements in respect of the magnet 41 and the pre-selected electro-magnets 15—17. The magnet 41 sets the control member 42 for the return movement of the carriage or the stop 11, and the pawls 19 of the pre-selected electro-magnets move into the operative position against the gauge carriers 5—7. The electro-magnets 15—17 which are set into operation are determined by the position of the switches 21—23 on the pre-selector 18, i.e., by the adjusted gauge. The stop 11, which is now again connected to the carriage 1, is withdrawn to the extent required by the pre-selected gauge in the gauge carrier 5 which, as already described, is determined by the contact bar 33. As already mentioned, the gauges 9 in the stop line move into the position of rest, whereby there is closed the switch 36. The contact 34 wiping over the contact bar 33 stops the movement of the carriage by completion of the circuit by way of the magnet 41 when moving against the contact of the bar 33 selected by the pre-selector. At the same time, as already described, the magnet 43 receives current for a brief period, whereby the lever 30, 31 releases the gauge carriers 5—7. The electric motor 13 now also receives current, and since its direction of rotation, as stated, has already been reversed by the duplex switches 46, it now moves the gauge carriers 5 out of the initial position and the pre-selected gauges 9 are moved into the position of operation. The rings 24 thereby thrust with their projections 20 against the pawls 19 on the pre-selected electro-magnets 15—17 and are held, whereby the rings 24 rotate in opposition to the force of the springs until the grooves 27, 28 in all gauge carriers 5—7 are in register and the teeth 30 of the lever 30, 31 are able to engage in the grooves, whereby all gauge carriers are firmly held in this position.

However, engagement of the teeth 30 in the grooves 27, 28 may take place only in conjunction with all gauge carriers 5—7 simultaneously. In this way it is ensured that operation at the switch 29 cannot occur until all gauge carriers of the pre-selected measuring gauge 9 have been moved into the stop line. Upon engagement of the lever 30, 31 the lower contact of the switch 29 disconnects the electric motor 13 and the upper contact energises the magnet 41, which sets the control piston 42 for advance of the carriage. Upon the setting of the magnet 41 there is actuated at the same time an electrical switch means which de-energises the contact bar 33, so that no new switching operation can be initiated. The carriage 1 is advanced until the stop 11 has moved the gauge 9 located in the stop line against the stop 10. As already described in conjunction with the zero adjustment, the circuit is thereby broken by the switch 36. The stop 11 controls by way of the lever 47 the control valve 48, which reduces the flow of pressure fluid to the piston 2 in order that the collar on the stop 11 against the support 38 and the gauge 9 in the stop line will not meet abruptly one against the other. The control operation is completed by the valve 48, and by way of the lever 47 and the switch 49 the circuit is broken after a certain lapse of time, in which the choke 50 has built up against the piston 2 an even fluid pressure by which the measuring gauges are pressed together in the stop line. The automatic adjustment of the carriage in its new position, which occurs in accordance with a gauge as adjusted on the pre-selector, is thus completed.

By means of the stated improvement in the setting means described and claimed in the prior application referred to there may be adjusted as datum point in respect of the setting of the gauges any desired point in the adjustment range, whereby very considerable advantage is obtained in the truing up of a work table.

I claim:

1. A device for automatically controlling the distance of linear travel of the main carriage of a machine tool on a bed of the machine tool in reference to a datum point, said device comprising several gauge carriers each including a set of gauges, said gauge carriers being rotatable about a common axis and displaceable along said axis, selecting means for controlling the rotational position of said carriers to move a selected gauge in each set into a common measuring line, a first stop means stationarily mounted in the bed adjacent to the gauge set at one end of said measuring line, a second stop means, an auxiliary carriage mounting said second stop means and disposed between the main carriage and the bed and slidable parallel to the direction of travel of the main carriage, said second stop means being disposed adjacent to the gauge set at the other end of the measuring line, first releasable clamping means for clamping the auxiliary carriage and with it the second stop means to the main carriage in a selected longitudinal position relative thereto, second releasable clamping means for clamping the auxiliary carriage and with it the second stop means to the bed in a selected longitudinal position relative thereto, and control means for selectively operating said first and second clamping means for clamping and release action respectively, whereby movement of the main carriage jointly with the auxiliary carriage and the second stop means into and out of engagement with the gauge set in the respective end of the measuring line controls the axial spacing between the gauge carriers and whereby clamping of the second stop means to the bed retains the gauge carriers in an axial spacing set by said main carriage movement.

2. A device according to claim 1 wherein said clamping means each include electromagnetic actuating means, and wherein said control means comprise switch means for selectively connecting the actuating means of either clamping means in an energizing circuit.

3. A device according to claim 2 wherein said clamping means each comprise an exciting coil mounted on the main carriage and the bed respectively, and a movable core terminating in a clamping member engageable with the auxiliary carriage for clamping action.

References Cited in the file of this patent

UNITED STATES PATENTS 1,787,337    Booth _____ Dec. 30, 1930

FOREIGN PATENTS 1,112,168    France _____ Nov. 9, 1955